(12) United States Patent
Taguchi et al.

(10) Patent No.: US 7,460,061 B2
(45) Date of Patent: Dec. 2, 2008

(54) DISTRIBUTED RADAR DATA PROCESSING SYSTEM

(75) Inventors: Jitsuo Taguchi, Yokohama (JP); Tatsuro Yamada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 11/334,494

(22) Filed: Jan. 19, 2006

(65) Prior Publication Data

US 2006/0250295 A1    Nov. 9, 2006

(30) Foreign Application Priority Data

Jan. 31, 2005  (JP)  ............... 2005-024106

(51) Int. Cl.
*G01S 13/88* (2006.01)
*G01S 7/02* (2006.01)
*G06F 13/368* (2006.01)
*G01S 13/00* (2006.01)

(52) U.S. Cl. ............ 342/195; 342/36; 342/175; 710/100; 710/107; 710/119; 710/120

(58) Field of Classification Search ............ 342/36–40, 342/175, 195, 25 R, 25 F, 73–103, 159–162, 342/190, 194, 59, 176–186; 712/28–31; 709/201–203, 208–211, 248, 253; 702/189–199; 701/200, 207; 710/100, 107, 119, 120
See application file for complete search history.

(56) References Cited

U.S. PATENT DOCUMENTS

| | | | |
|---|---|---|---|
| 3,721,979 A * | 3/1973 | Gouldthorpe | ............... 342/94 |
| 4,339,752 A * | 7/1982 | Williams et al. | ............ 342/194 |
| 4,754,395 A | 6/1988 | Weisshaar et al. | |
| 4,788,547 A * | 11/1988 | Jones et al. | ................... 342/80 |
| 5,138,321 A * | 8/1992 | Hammer | ..................... 342/36 |
| 5,214,433 A * | 5/1993 | Alouani et al. | ................ 342/95 |
| 5,386,370 A * | 1/1995 | Woo | ........................... 701/207 |
| 5,657,251 A * | 8/1997 | Fiala | .......................... 342/162 |
| 5,765,166 A * | 6/1998 | Gotfried et al. | ............. 342/190 |
| 5,949,367 A * | 9/1999 | Trompf et al. | ................ 342/90 |
| 6,338,011 B1 | 1/2002 | Furst et al. | |
| 6,388,605 B1 * | 5/2002 | Petz et al. | .................. 342/25 R |
| 6,704,692 B1 * | 3/2004 | Banerjee et al. | ............. 702/189 |
| 2004/0024622 A1 | 2/2004 | Knight | |
| 2004/0039806 A1 | 2/2004 | Miras | |

FOREIGN PATENT DOCUMENTS

| | | |
|---|---|---|
| EP | 0 266 784 A2 | 5/1988 |
| JP | 7-5248 | 1/1995 |
| WO | WO 03/077068 A2 | 9/2003 |

\* cited by examiner

*Primary Examiner*—Bernarr E Gregory
(74) *Attorney, Agent, or Firm*—Oblon, Spivak, McClelland, Maier & Neustadt, P.C.

(57) ABSTRACT

A distributed radar data processing system for generating data to be supplied to air traffic control by processing radar data obtained from a radar device, comprises a plurality of data buses provided in accordance with types of flowing data, a plurality of applications which is distributed and allocated to each of a plurality of hierarchical layers separated by the plurality of data buses, and connected to two of the data buses configuring a particular layer to realize a predetermined function, and a distribution and integration interface for controlling a connection between the plurality of applications.

4 Claims, 5 Drawing Sheets

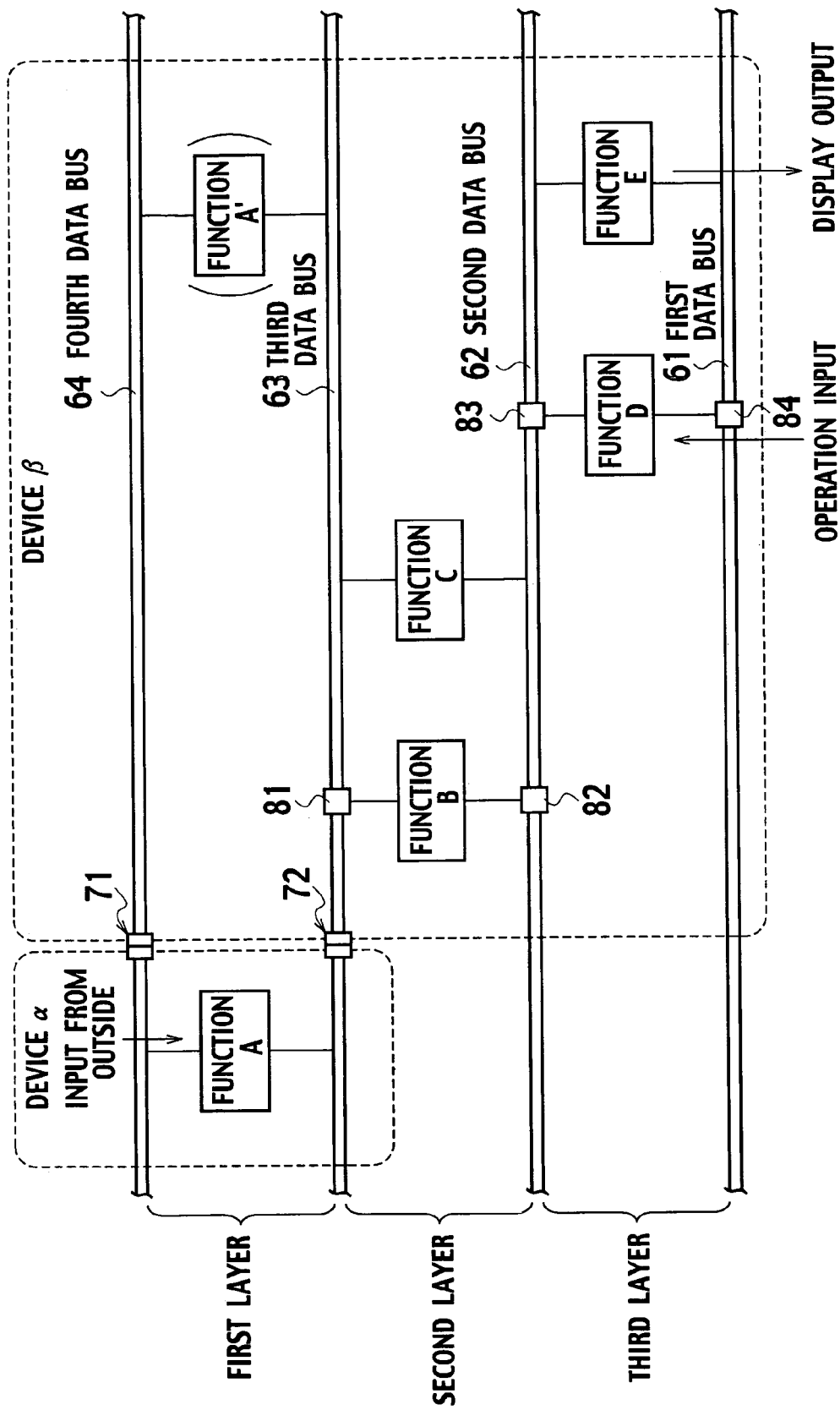

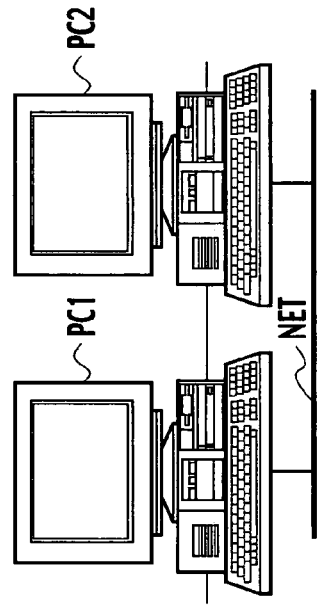
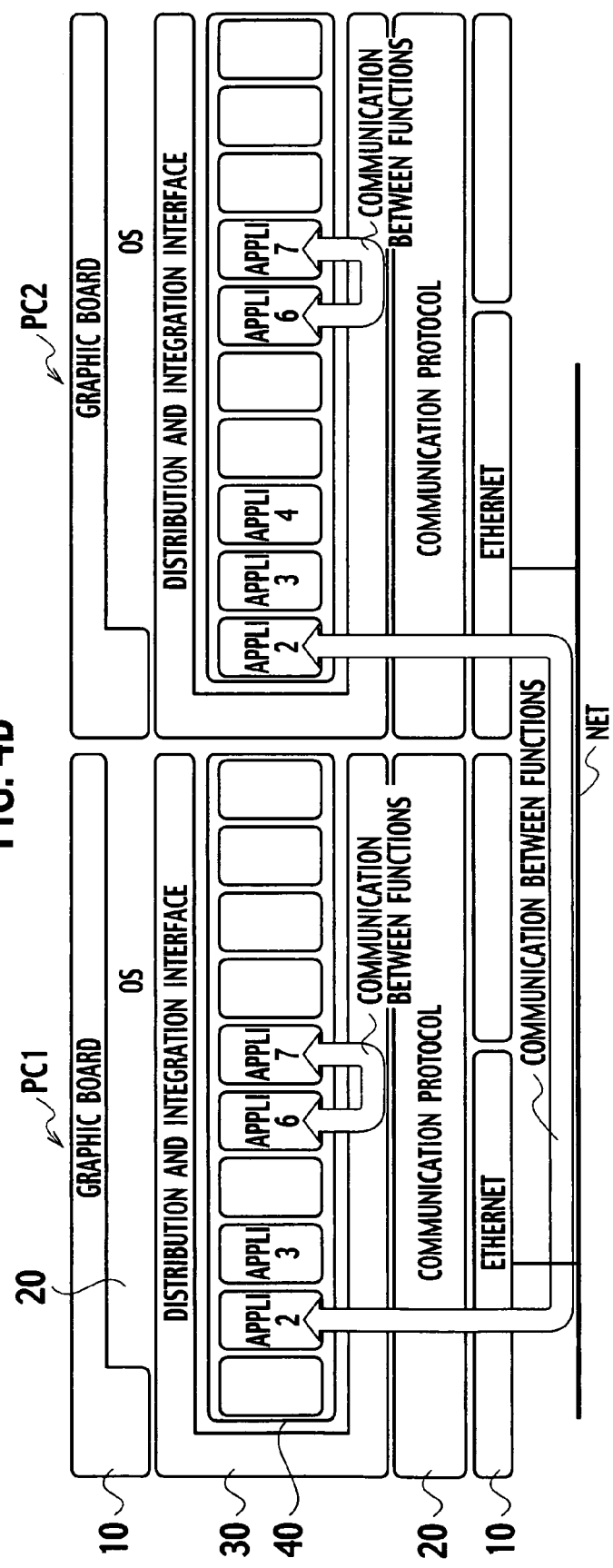

DISTRIBUTED RADAR DATA PROCESSING SYSTEM

CROSS REFERENCE TO RELATED APPLICATIONS

This application is based upon and claims the benefit of priority from prior Japanese Patent Application No. 2005-24106, filed on Jan. 31, 2005; the entire contents of which are incorporated herein by reference.

BACKGROUND OF THE INVENTION

1. Field of the Invention

The present invention relates to a distributed radar data processing system for processing radar data obtained from a radar device in an air traffic control radar system, and particularly to a technology for distributed processing of radar data.

2. Description of the Related Art

A conventionally-known air traffic control radar system carries out air traffic control by first transmitting signals having a predetermined frequency from a radar device, receiving reflected waves, the return transmitted signals reflected from a plane, and detecting the traveling direction and speed of the plane. An example of such air control radar system is disclosed in Japanese Patent Laid-Open Publication No. Heisei7-5248 as a three dimensional imaging radar that is switched between two operating frequencies, that improves reception of weak signals, and that has improved signal processing capabilities and processing efficiency.

As shown in FIG. 1, for example, a conventional air traffic control radar system includes a radar device 100, a radar data processing system (RDPS) 200, and a plurality of consoles/display devices 300, and thus is called a centralized system.

The radar device 100 is configured by an antenna, a transmitter, a receiver, and a target detector which are not illustrated. The transmitter transmits radio waves through the antenna towards a target. The transmitted waves are reflected from the target and the receiver receives the reflected waves by the antenna and generates received signals. The received signals are transmitted to the radar data processing system 200 as radar data.

The radar data processing system 200 is configured by, for example, a single high performance electronic computer which incorporates software to realize various functions such as tracking, flight plan, display, and control operation. The radar data processing system 200 transmits a processing result of radar data from the radar device 100 to the consoles/display devices 300 to allow them to display the result, and receives signals from the consoles/display devices 300 to control the radar device 100.

As stated above, the consoles/display devices 300 display an image of a detected target based upon a processing result of radar data transmitted from the radar data processing system 200, generates signals in response to console operations by an operator, and send the signals to the radar data processing system 200. The radar data processing system 200 controls the radar device 100 in accordance with the signals transmitted from the consoles/display devices 300.

Since a conventional air traffic control radar system is constructed as a centralized system as described earlier, a failure of the electronic computer configuring the radar data processing system 200 disables the entire air traffic control radar system. In order to deal with such a situation, an air traffic control radar system generally is provided with a redundant system.

Incidentally, in the present day, the universal level of maintenance for air traffic control radar systems has reached a certain point and they are now in the so-called conversion phase. However, in order to convert a conventional air traffic control radar system into a high performance and high functionality air traffic control radar system to meet client's specifications without changing the centralized system itself, it is necessary to change an operating system (OS), a special interface or peripherals. As a result, development of new software will be required for such changes, which makes the air traffic control radar system more expensive.

Moreover, since an electronic computer used in the radar data processing system works only with a particular platform (operating system or hardware), it is not flexible enough to adopt expansion or reduction of an air traffic control radar system. Therefore, the same problem as above will occur again in the event of the next conversion.

Accordingly, there has been a demand for development of a radar data processing system that is not affected by platforms, that enables a non-high performance electronic computer to work, that can meet clients' various specifications, that is flexible enough to deal with expansion and reduction of a radar system, and that is manufactured in a short period of time and inexpensive.

SUMMARY OF THE INVENTION

The present invention has been accomplished to respond such a demand and an objective thereof is to provide a distributed radar data processing system that avoids a shutdown of the entire system even if a part of the system has a failure, that is flexible enough to adopt modifications of the system, and that is manufactured in a short period of time and inexpensive.

In order to achieve the above objective, the distributed radar data processing system according to the present invention which generates data to be supplied to air traffic control by processing radar data obtained from a radar device comprises a plurality of data buses provided in accordance with types of flowing data, a plurality of applications distributed and allocated to a plurality of hierarchical layers separated by the plurality of data buses, and connected to two of the data buses configuring a particular layer to realize a predetermined function, and a distribution and integration interface for controlling a connection between the plurality of applications.

According to the distributed radar data processing system of the present invention, the system is of a distributed type where the functions are distributed and located throughout the plurality of hierarchical layers. Therefore, even if a part of the functions goes wrong, a shutdown of the whole system can be avoided.

Moreover, since the plurality of functions is distributed, devices for realizing the individual functions do not necessarily have to be high performance, enabling to construct an inexpensive distributed radar data processing system. Furthermore, thanks to the distribution and integration interface, the functions can be easily added or deleted. Hence, it becomes possible for the system to meet various needs of clients, to have greater flexibility, and even to be able to be changed in a short period of time.

BRIEF DESCRIPTION OF DRAWINGS

FIG. 3 is a conceptual view of the structure of a distributed radar data processing system according to a first embodiment of the present invention;

FIGS. 4A and 4B are views showing a specific structure of the distributed radar data processing system according to the present invention.

DETAILED DESCRIPTION OF THE INVENTION

Hereinafter, a distributed radar data processing system according to an embodiment of the present invention is detailed with reference to the drawings.

FIRST EMBODIMENT

First of all, the outline of the present invention is given. The present invention is a radar data processing system having a construction of a distributed type where the radar system is divided into different functions (or devices) to remove the drawbacks of the aforementioned centralized system. The present invention has particular characteristics in the structure of an interface (hereinafter, referred to as a "distribution and integration interface") for connecting one function to another when there are a plurality of separate functions, and in a mechanism (hereinafter, referred to as a "task parameter control") for passing control (parameters) between the functions.

Figure 1:
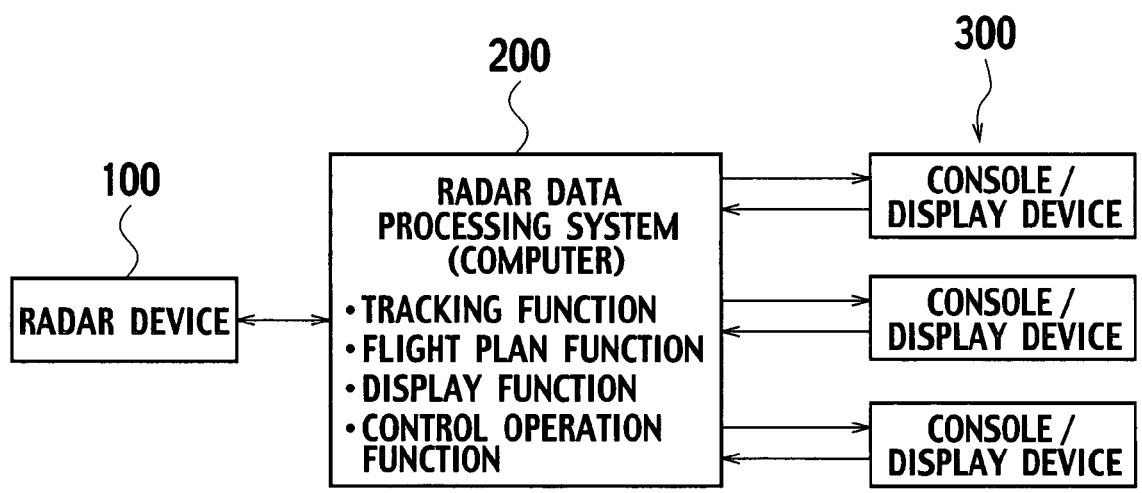
FIG. 1 is an explanatory view of a conventional air traffic control radar system.
Figure 2:
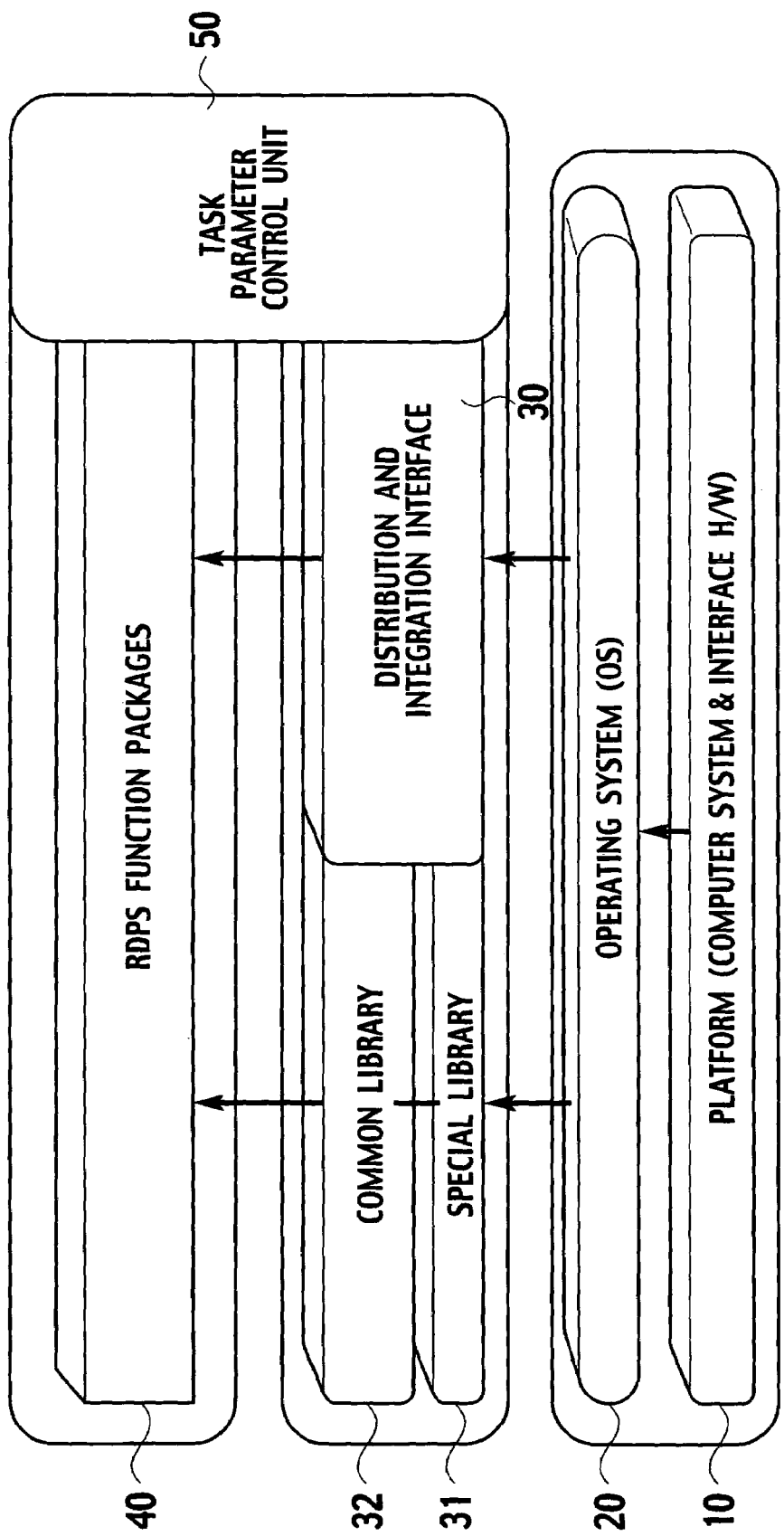
FIG. 2 is a conceptual view of a distributed radar data processing system according to the present invention.

FIG. 2 is a conceptual view of the distributed radar data processing system according to the present invention. The distributed radar data processing system includes a platform 10, an operating system (OS) 20, a distribution and integration interface 30, an RDPS function packages 40, and a task parameter control unit 50.

The platform 10 is a computer system, a type of interface hardware or the like which is the base for functioning the operating system 20. The operating system 20 operates dependently on the platform 10.

Note that, in the distributed radar data processing system according to the first embodiment, applications (details thereof are explained later) are adopted to operate in a multi-platform, that is, a plurality of different kinds of operating systems and hardware. Hence, the applications can operate in, for example, any of a personal computer (PC) and an operating system installed therein, a board embedded computer (PCC) and another operating system installed therein, and an engineering work station (EWS) and yet another operating system installed therein. This means that the applications can operate in a multi-platform.

The distribution and integration interface 30 includes a special library 31 and a common library 32. The special library 31 is configured by, for example, software which operates dependently on the operating system 20 such as a device driver and hardware configuring the platform 10. When converting the system to work with a multi-platform, a partial modification of the special library 31 realizes upward compatibility.

The common library 32 is configured by software commonly used among the plurality of applications. As for changes, version upgrades, and revision upgrades of operating systems, upward compatibility is maintained by modification of the common library 32.

The RDPS function packages 40 are configured by a conglomeration of general-purpose software packaged for each function (hereinafter, referred to as "packages"). Each package operates independently from the operating system 20 and the platform 10. The applications are realized by combining the plurality of packages included in the RDPS function packages 40. Therefore, conventional applications can be used as they are even if the operating system 20 or the platform 10 (computer system and interface hardware) is changed.

The functions realized by combinations of packages within the RDPS function packages 40 include primary "basic functions," "standard functions" essential for the device, and "optional functions" selected where necessary.

The basic functions include (1) tracking, and (2) control display and input. The standard functions include (3) system monitor and control, (4) flight plan, and (5) off line. The optional functions include (6) warning monitor, (7) record and play, (8) system connection, (9) pseudo-target creation, and the like.

The task parameter control unit 50 links the special library 31 and the common library 32 included in the distribution and integration interface 30 and the packages included in the RDPS function packages 40. Through the link between them established by the task parameter control unit 50, applications which actually operate to carry out predetermined functions are realized.

FIG. 3 is a conceptual view of the structure of the distributed radar data processing system according to the first embodiment of the present invention. The distributed radar data processing system has a distributed structure and a hierarchical structure. In other words, the distributed radar data processing system has a three layer structure comprising a first layer to which a function(s) responsible for human interface is allocated, a second layer to which a function(s) to execute internal processing is allocated, and a third layer to which a function(s) to carry out external input and output is allocated. On both surfaces of each layer, first to fourth data buses 61 to 64 are defined. The data buses 61 to 64 are provided in accordance with types of flowing data, for example, characteristics of data including a flow speed and frequency of occurrences.

To be more specific, the first layer is sandwiched between the first data bus 61 and the second data bus 62, and the function allocated to the first layer performs data input and output using the first data bus 61 and the second data bus 62. The second layer is sandwiched by the second data bus 62 and the third data bus 63, and the function allocated to the second layer performs data input and output using the second data bus 62 and the third data bus 63. Further, the third layer is sandwiched between the third data bus 63 and the fourth data bus 64, and the function allocated to the third layer performs data input and output using the third data bus 63 and the fourth data bus 64.

In the example shown in FIG. 3, Function A is allocated to the third layer and Functions B and C are allocated to the second layer, and Functions D and E are allocated to the first layer. The tracking function stated earlier as (1), for example, may be applied to Function A.

Function A, for example, inputs radar data transmitted from the outside (for example, a non-illustrated radar device) through the fourth data bus 64 and carries out tracking processing. A result of the tracking performed by Function A is outputted to the third data bus 63. Therefore, Functions B and C allocated to the second layer can obtain the result of the tracking processing from the third data bus 63 and utilize it.

The flight plan function stated earlier as (4), for example, may be applied to Function B. Also, the system monitor and control function and the off line function stated earlier as (3) and (5) respectively, for example, may be applied to Function C. For example, Function C inputs the result of the tracking processing transmitted from Function A through the third data bus 63 and carries out the system monitor and control processing. A result of the system monitor and control processing performed by Function C is outputted to the second data bus 62. Therefore, Functions D and E allocated to the first layer can obtain the result of system monitor and control processing from the second data bus 62 and utilize it.

The control input function stated earlier as in (2) the control display and input, for example, may be applied to Function D. The control display function stated earlier as in (2) the control display and input, for example, may be applied to Function E. Function D enables an operator to perform inputs of data and Function E enables a display device to display data.

Function E, for example, inputs a result of system monitor and control processing transmitted from Function C through the second data bus 62 and carries out the display processing. The result of display is outputted to the first data bus 61. Therefore, a display device (not shown) connected to the first data bus 61 acquires the result of display processing carried out by Function E and displays the result on its screen.

FIG. 3 shows an example of the distribution radar data processing system where only Function A of the third layer is mounted on a device α, and Functions B to E of the second and third layers are mounted on a device β. In this example, the fourth data bus 64 in the device α is extended into the device β through a connector 71 (and a cable where necessary), and the third data bus 63 of the device α is extended into the device β through a connector 72.

Note that, where the device α having Function A is not connected to the device β, Function A' equivalent to Function A may be mounted on the device β.

In the example shown in FIG. 3, although Function A of the third layer is provided in the device α that is different from the device β, Function B or C of the second layer may also be provided in the device α or other device through connectors. Similarly, Function D or E of the first layer may be provided in the device α or other device through connectors. Furthermore, for example, the third data bus 63 and the fourth data bus 64 extended into the device α may be further extended into another device γ (not shown) through connectors and other functions may be mounted thereon.

With this configuration, it becomes possible to construct a radar data processing system which allows a plurality of functions to be distributed not only within a device itself but also into a plurality of devices.

Furthermore, the distributed radar data processing system according to the first embodiment realizes "plug-in" of the functions. Specifically, additions and deletions of he functions into/from the distributed radar data processing system can be done as if attaching and detaching a substrate to/from a device.

In the example shown in FIG. 3, Function B is mounted through a plug 81 provided on the third data bus 63 of the second layer and a plug 82 provided on the second data bus 62 of the same layer. Function D is mounted through a plug 83 provided on the second data bus 62 of the first layer and a plug 84 provided on the first data bus 61 on the same layer. Functions B and D can be removed from the distributed radar data processing system where necessary.

With this configuration, when building a distributed system in which a plurality of functions is distributed, the functions may of course be distributed in a single device and may also be distributed in a plurality of devices. Therefore, each device constructing the distributed radar data processing system does not necessarily have to be high performance. In other words, types and number of functions to be distributed can be decided in accordance with performance of each device.

Moreover, in the example shown in FIG. 3, when the device α for carrying out Function A fails, operation can be continued by the use of Function A' within the device β. This realizes a distributed radar data processing system having high durability against failures.

FIGS. 4A and 4B are views showing a specific structure of the distributed radar data processing system conceptually shown in FIG. 2. As shown in FIG. 4A, the distributed radar data processing system is constructed by connecting electronic computers PC1 and PC2 through a network NET. The network NET may be, for example, Ethernet (registered trademark).

FIG. 4B is a view showing the internal structures of the electronic computers PC1 and PC2. The electronic computers PC1 and PC2 have the same internal structure.

The RDPS function packages 40 at the center are depicted as applications 1, 2, . . . (hereinafter, abbreviated as "Appli") that are configured by combinations of a plurality of packages. There is the distribution and integration interface 30 provided outside the RDPS function packages 40, and the operating system (OS) 20 is provided outside the distribution and integration interface 30.

The operating system 20 includes a communication protocol. Further, the platform 10 is provided outside the operating system 20. The platform 10 includes hardware such as a graphic board, an Ethernet board, and RS232C/RS422 board.

Whether or not the Appli 1, 2, . . . , are used in each of the electronic computers PC1 and PC2 is determined based upon functions mounted on each electronic computer. The example shown in FIGS. 4A and 4B represents a case where Appli 2 is used between devices, and Appli 6 and Appli 7 are used between functions.

With such structure, processing is performed so that each application is operated in a multi-platform by the distribution and integration interface 30, thereby making it possible for data passing to be carried out without consideration of a device to be connected as well as a physical interface.

Figure 5:
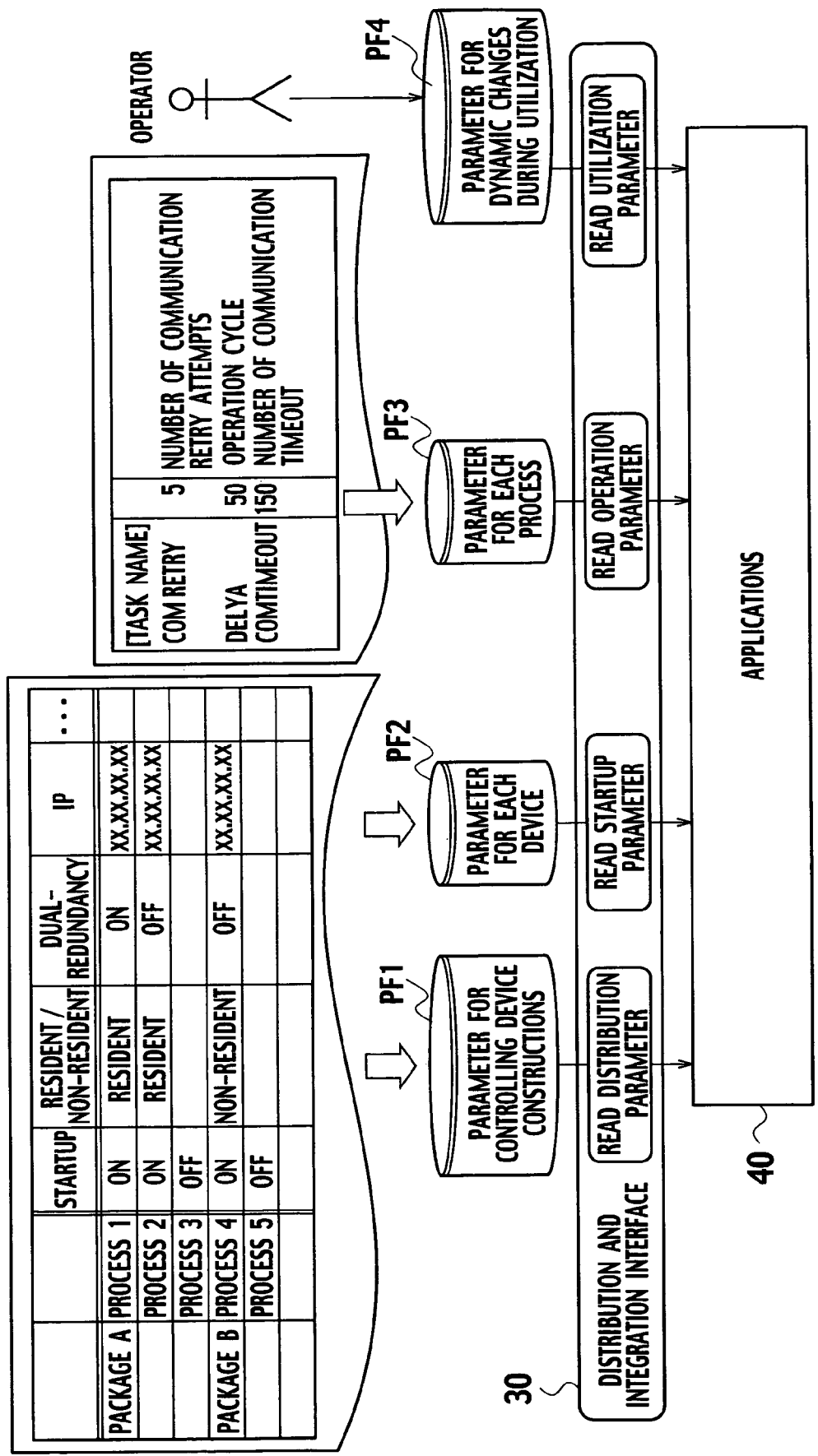
FIG. 5 is a view showing a specific example of a task parameter control unit in the distributed radar data processing system according to the present invention.

Next, a specific example of the task parameter control unit 50 shown in FIG. 2 is described. FIG. 5 is an explanatory view of the construction and operation of the task parameter control unit 50 in the radar data processing system according to the present invention.

The task parameter control unit 50 is provided with four parameter files: first to fourth parameter files PF1 to PF4. The four parameter files control the entire task parameters.

The first parameter file PF1 stores a distribution parameter for controlling device structures. The distribution parameter is configured by data representing in which devices (electronic computers) packages are present. The distribution parameter contains, for example, data related to each package such as presence or absence of startup, whether it is resident or not resident, presence or absence of dual-redundancy, and an IP address.

Note that the distribution parameter stored in the first parameter file PF1 is distributed by a master, one of the devices configuring the distributed radar data processing system, to the remaining devices acting as slaves.

The second parameter file PF2 stores a startup parameter for each device. The startup parameter is configured only by data related to a package(s) present in its own device (electronic computer), and contains, for example, terminal information (a function of its own terminal and the terminal number) that defines the device.

The third parameter file PF3 stores an operation parameter for each process. The operation parameter contains data required in order to carry out each task, such as the number of communication retry attempts, an operation cycle, the number of communication timeout. The operation parameter may be able to limit changes in each process.

The fourth parameter file PF4 stores a utilization parameter which can be dynamically changed by an operator during utilization of the system in each process. The utilization parameter contains, for example, data for changing colors of a screen or sizes of characters.

The task parameter control unit 50 operates applications by providing the applications with each parameter stored in the first to fourth parameter files PF1 to PF4.

Specifically, where the distribution parameter stored in the first parameter file PF1 determines whether startup of a package is necessary and if it is determined that it is necessary, the package is started under conditions in accordance with a startup parameter stored in the second parameter file PF2, and the started package is operated in accordance with an operation parameter stored in the third parameter file PF3. At this time, display and the like is changed in accordance with the utilization parameter stored in the fourth parameter file PF4.

Since the construction is such that applications are operated in accordance with parameters stored in the task parameter control unit 50 as stated above, it is not necessary to change the applications themselves even if a platform (computer system and interface hardware) for the applications is changed. Therefore, a burden to develop new software can be reduced in the event of conversion of a radar data processing system.

As described so far, according to the distributed radar data processing system according to the first embodiment of the present invention, the system has the distributed construction where Functions A to E are distributed and located throughout the first to third layers which represent a hierarchical structure established by the first to fourth data buses 61 to 64 provided in accordance with types of flowing data. Therefore, even if a part of the functions goes wrong, a shutdown of the whole system can be avoided.

Moreover, since the plurality of Functions A to E is distributed, devices for realizing the individual functions do not necessarily have to be high performance, thereby enabling to construct an inexpensive distributed radar data processing system.

Furthermore, thanks to the distribution and integration interface 30, Functions A to E can be easily added or deleted. Hence, it becomes possible for the system to meet various needs of clients, to have greater flexibility, and even be able to be changed in a short period of time.

What is claimed is:

1. A distributed radar data processing system configured to generate and supply data to air traffic control by processing radar data obtained from a radar device, comprising:
    a plurality of data buses configured to transfer a plurality of types of data, each data bus transferring one of the plurality of types of data, the types of data including the radar data obtained from the radar device and the data supplied to the air traffic control, the data buses defining a plurality of hierarchical layers;
    a plurality of application units configured to store applications distributed and allocated to each of the hierarchical layers defined by the data buses, and each application unit connected to two of the data buses defining a particular layer, the layers adapted to perform predetermined functions including processing the radar data from the radar device and generating the data supplied to the air traffic control; and
    a distribution and integration interface configured to control a connection between the plurality of applications.

2. The distributed radar data processing system according to claim 1,
    wherein the plurality of data buses and layers is formed so that they extend over at least two devices, and
    the distribution and integration interface controls a connection between the application unit within one device and the application unit within another device.

3. The distributed radar data processing system according to claim 2, further comprising:
    a task parameter control unit configured to control a parameter necessary for operation of the plurality of applications,
    wherein the distribution and integration interface connects the plurality of application units to each other and operates the plurality of applications by the use of the parameter controlled by the task parameter control unit.

4. The distributed radar data processing system according to claim 1, further comprising:
    a task parameter control unit configured to control a parameter necessary for operation of the plurality of applications,
    wherein the distribution and integration interface connects the plurality of application units to each other and operates the plurality of applications by the use of the parameter controlled by the task parameter control unit.

* * * * *